United States Patent
Coutts et al.

(10) Patent No.: US 6,810,394 B2
(45) Date of Patent: Oct. 26, 2004

(54) METHODS AND APPARATUS FOR SEARCHING FOR AND IDENTIFYING INFORMATION OF INTEREST TO USERS

(75) Inventors: Michael G. Coutts, Dundee (GB); Iain R. F. Sime, Angus (GB); Lee G. Dove, Coupar Angus (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/978,503

(22) Filed: Oct. 16, 2001

(65) Prior Publication Data

US 2003/0069867 A1 Apr. 10, 2003

(30) Foreign Application Priority Data

Oct. 17, 2000 (GB) .............................................. 0025430

(51) Int. Cl.[7] .............................................. G06F 17/30
(52) U.S. Cl. ...................... 707/3; 707/2; 707/4; 707/5; 707/100; 707/102; 707/104.1; 709/217; 709/218; 709/219; 709/213
(58) Field of Search ......................... 707/2–5, 10, 100, 707/102, 104.1; 709/213–219

(56) References Cited

U.S. PATENT DOCUMENTS

| 3,921,642 A | * | 11/1975 | Preston et al. .................. 607/9 |
| 5,717,913 A |   | 2/1998  | Driscoll |
| 5,758,076 A | * | 5/1998  | Wu et al. .................... 709/231 |
| 5,768,142 A | * | 6/1998  | Jacobs ........................ 700/231 |
| 5,911,043 A | * | 6/1999  | Duffy et al. ................. 709/203 |
| 6,434,550 B1 | * | 8/2002 | Warner et al. .................. 707/3 |
| 2003/0033298 A1 | * | 2/2003 | Sundaresan .................... 707/5 |
| 2003/0033299 A1 | * | 2/2003 | Sundaresan .................... 707/5 |

FOREIGN PATENT DOCUMENTS

| EP | 1050830 | 11/2000 |  |
| GB | 2314178 | 12/1997 |  |
| GB | 2336697 A | * 10/1999 |  |
| GB | 2336697 | 10/1999 | ........... G06F/17/30 |
| JP | 278678 | 10/2000 |  |
| WO | 9529451 | 11/1995 |  |
| WO | 9945480 | 9/1999 |  |

* cited by examiner

Primary Examiner—Frantz Coby
(74) Attorney, Agent, or Firm—Priest & Goldstein PLLC

(57) ABSTRACT

An information system. The system provides a user interface for selecting subject matter of interest to a user as well as various components for retrieving information items, for classifying information items to identify information items relating to the selected subject matter, for rating the identified information items, and for notifying the user about identified information items meeting a predetermined criteria. The system also includes components for requesting a subject mailer expert (SME) to apply a rating to the retrieved information items. The predetermined criteria typically include the information item having a rating exceeding an interest value set by the user.

17 Claims, 14 Drawing Sheets

| SUPERCLASS | SUBCLASS |
|---|---|
| DISPLAYS | LCD |
| DISPLAYS | CRT |
| DISPLAYS | PLASMA |
| LCD | TWISTED NEMATIC |
| LCD | TFT |

| SUPERCLASS-SUBCLASS | KEYWORDS |
|---|---|
| DISPLAYS: LCD | "LIQUID" AND "CRYSTAL" AND "DISPLAY" |
| DISPLAYS: LCD | "FLAT" AND "PANEL" |
| DISPLAYS: LCD | "POLARISE" AND "FILTER" AND "DISPLAY" |
| LCD: TWISTED NEMATIC | "TWISTED" AND "NEMATIC" |
| LCD: TFT | "THIN" AND "FILM" AND "TRANSISTOR" |

| USER (114a) | CONCEPT (114b) | INTEREST VALUE (114c) |
|---|---|---|
| RM78343 | DISPLAYS: LCD | 52% |
| RM78343 | IMAGING: DISPLAYS | 46% |
| MC34231 | DISPLAYS: LCD | 81% |

| SME (116a) | CONCEPT (116b) | THRESHOLD (116c) |
|---|---|---|
| DS56743 | DISPLAYS: LCD | 60% |
| DS56743 | DISPLAYS: CRT | 48% |
| RT76354 | MEMORY: RAM | 36% |

FIG. 13

| DOCUMENT REFERENCE | CONCEPT |
|---|---|
| #1234 | DISPLAYS: LCD |
| #1234 | DISPLAYS: CRT |
| #1598 | IMAGING: DISPLAYS |

FIG. 14

| DOCUMENT REFERENCE | CONCEPT | RATING | RATED BY |
|---|---|---|---|
| #1234 | DISPLAYS: LCD | 80% | AUTO |
| #1234 | DISPLAYS: CRT | 45% | SME |
| #1598 | IMAGING: DISPLAYS | 39% | SME |

| DOCUMENT REFERENCE | CONCEPT | SME | RATED |
|---|---|---|---|
| #1234 | DISPLAYS: LCD | DS56743 | |
| #1743 | MEMORY: RAM | RT76354 | ✓ |

METHODS AND APPARATUS FOR SEARCHING FOR AND IDENTIFYING INFORMATION OF INTEREST TO USERS

BACKGROUND OF THE INVENTION

The present invention relates to an information system and to a method of retrieving information. In particular, the invention relates to an information system for retrieving and rating targeted electronic information.

The advent of networks, and particularly the Internet with its World Wide Web ("Web") facility, has caused a huge increase in the amount of electronic information available to individual users and to organizations. This information is typically made available as documents on Web sites, electronic news feeds, subscription data feeds, and such like. Much of this electronic information is document based.

One problem associated with having a vast amount of available electronic information is how to locate relevant items in the mass of information.

Internet search engines are available which allow users to locate only those Web pages containing certain key words, or relating to certain topics or subjects. However, one problem with search engines is that the user must repeat the search regularly to locate new information. Another problem is that even if a user performs a search regularly, it is difficult to determine short or long term trends from such a search. If the searches are not performed frequently enough, then time-critical, information items may be missed. Yet another problem is that Internet search engines may not provide an adequate indication of how the volume of information items has changed since the last search was performed.

A large organization typically has a substantial number of people who are interested in a specific subject of importance to that organization. The specific subject may be, for example, a particular technology, a market segment, new legislation, or such like. To remain up to date with developments in the specific subject, the organization typically has one or more subject matter experts (SMEs). The SMEs are people who monitor developments in the specific subject and provide other members of the organization with synopsis information relating to the specific subject.

One problem with relying on SMEs is that the information they have is typically retained by the individuals rather than in electronic systems. This means that it is difficult to make the information available across a large organization that may span several countries.

SUMMARY OF THE INVENTION

It is among the objects of an embodiment of the present invention to obviate or mitigate one or more of the above disadvantages or other disadvantages associated with information retrieval, classification, and retention.

According to a first aspect of the present invention there is provided an information system comprising: means for selecting subject matter of interest to a user; means for retrieving information items; means for classifying information items to identify information items relating to the selected subject matter; means for rating the identified information items; and means for notifying the user about identified information items meeting a predetermined criteria.

Preferably, the means for selecting subject matter of interest to a user includes means for allowing a user to select an interest value, so that only those information items rated above that interest value will be notified to the user.

Preferably, the means for selecting subject matter of interest to a user is implemented by an application presenting a user with an interface through which the user may select subject matter of interest.

Preferably, the means for retrieving information items retrieves items prior to the means for classifying items classifying the retrieved items. Thus, all new information items are retrieved, regardless of whether they relate to a selected subject matter or not; those new information items relating to a selected subject matter are then identified, and those new information items not relating to a selected subject matter are discarded.

Alternatively, the means for retrieving information items only retrieves those items that have been identified by the classifying means as relating to the selected subject matter. This is less preferable because it is more difficult to classify information items at a third party's Web site, as this may require some form of mobile intelligent agent infrastructure, both on the third party's Web page and in the information system.

Preferably, the means for retrieving information items is operable to retrieve information via a network, such as a TCP/IP network. Conveniently, the retrieving means is operable to retrieve information using conventional protocols, such as HTTP (hypertext transfer protocol), FTP (file transfer protocol), and such like. In a preferred embodiment, a retrieval intelligent agent is used to make HTTP requests to certain pre-defined Web sites to retrieve newly-updated information from those Web sites.

Preferably, the means for retrieving information items is activated at regular intervals so that data sources are checked for relevant information on a regular basis. The information retrieving means may be activated during a night period, or some other period of low network traffic.

Preferably, the means for retrieving information items includes an extraction routine for extracting text from the information items (that is, for removing any images, control characters, tags, document format data, or such like that may be contained in the information items).

Preferably, the means for classifying information items includes a filtering routine for filtering out any information items that do not relate to the selected subject matter. Conveniently, the filtering routine operates by keyword searching on the extracted text, and by weighting the keywords using a concept hierarchy.

Preferably, the means for rating the identified information items is implemented automatically by an intelligent agent. Conveniently, the rating intelligent agent includes a rating component for performing the rating function. The rating component may comprise: a rules based system, such as an Expert system; or an artificial neural network; or a fuzzy system; or such like.

Information items may be documents or parts of documents, for example text extracted from a document.

The interface may provide a user with a hierarchical list of subject matter. For example, the highest level may comprise a list including: 'technology' information, 'legal' information, 'economic' information, 'financial' information, and such like. If a user selects, for example, 'technology' information, the next level may comprise a list of different technology areas, such as: 'displays', 'connectors', 'processors', and such like. Each of these technology areas would include a list of technology types within that area, for example, the next level after the 'displays' area may include: 'liquid crystal displays', 'plasma displays', 'cathode ray tubes', and such like.

Preferably, the interface allows a user to add new subject matter categories, for example, by adding new concepts and keywords relating to the new concepts. This allows the system to be adaptable so that it can gather information relating to emerging concepts.

Conveniently, the interface may be implemented by a Web browser.

The predetermined criteria includes the information item relating to a subject matter selected by the user, and preferably also includes the information item having a rating above the interest value for that subject matter set by the user.

Preferably, the information system is implemented using an intelligent agent infrastructure. Suitable conventional intelligent agent infrastructures are available, such as the Infosleuth (trade mark) infrastructure, as described in more detail at "http://www.mcc.com/projects/infosleuth/". Other agent systems, such as the Aglets (trade mark) infrastructure, or the Concordia (trade mark) infrastructure may be used. An Aglets Software Development Kit is available from IBM (trade mark). A Concordia infrastructure is available from Mitsibushi Electric Company at the Web URL http://www.meitca.com/HSL/Projects/Concordia/.

Software intelligent agents are well known and are explained in, for example, "Developing Intelligent Agents for Distributed Systems: Exploring Architecture, Technologies, and Applications" by Michael Knapik and Jay B. Johnson, McGraw-Hill; ISBN: 0070350116.

The advantage of using an intelligent agent infrastructure is that each component in the system can be programmed to perform a specific task; this allows the system to be scaled very easily, without having to re-write large amounts of software.

Alternatively, the system may be implemented as a single software program.

Preferably, the means for notifying the user of identified information items meeting a predetermined criteria is implemented using a notifying intelligent agent using an electronic delivery channel, such as electronic mail.

In preferred embodiments, a notice of updated information may be sent, and the new information items may be stored on, for example, a Web server that can be accessed by the user. In other embodiments, the new information items may be sent to the user.

The notifying means may include a comparing routine for determining whether a retrieved information item exceeds a predetermined threshold (an interest value). The comparing routine may comprise: a rules based system, such as an Expert system; or an artificial neural network; or a fuzzy system; or such like.

The system may further include feedback request means for requesting a subject matter expert to apply a rating to the retrieved information items.

The rating means may further comprise a feedback routine whereby the rating means automatically applies an initial rating using artificial intelligence; receives a rating applied by a subject matter expert; and modifies the rating and the rating process to approximate closer to the rating of the expert.

The feedback routine may be configured to learn about non-text based evaluation factors. For example, the feedback routine may learn that every article written by a certain author is always rated by a subject matter expert higher than the rating of the rating component.

The system may further comprise means for allowing an SME to subscribe to a concept (as an SME for that concept), and to enter a threshold value for that concept, so that the system will only request feedback from the SME for any item relating to that concept and having a rating exceeding the threshold value set by the SME.

One advantage of using a feedback routine is that an SME is able to participate in the evaluation of information items, so that the SME's knowledge is used to rate items. One advantage of allowing an SME to enter a threshold is that the SME only receives feedback requests for the most relevant items.

By virtue of this aspect of the invention, an information system is provided that automatically searches for new information items relating to selected subject matter, applies a value of importance to any relevant information items found, and notifies a user if an information item is obtained having an importance rating that exceeds a predetermined threshold value. This provides the users of the system with an array of information items relating to topics that are important to the users and that are rated according to their importance. Thus, the system behaves like an automated subject matter expert.

According to a second aspect of the invention there is provided a method of collecting selected information, the method comprising the steps of: identifying subject matter of interest to a user; retrieving information items relating to the identified subject matter; rating the retrieved information items; and notifying the user of retrieved information items meeting a predetermined criteria.

The step of retrieving information items relating to the identified subject matter may include the sub-steps of: identifying a plurality of sources of information, accessing each of the plurality of sources of information; for each source of information, extracting any information items relating to the identified subject matter.

The sub-step of extracting any information items relating to the identified subject matter preferably includes the sub-step of only extracting any information item which is more recent than the information item retrieved on a previous visit to the information source.

The sub-step of extracting any information items relating to the identified subject matter may be replaced by the sub-steps of extracting any new information items, and filtering out from the new information items those items relating to the identified subject matter.

The step of rating the retrieved information items may include the sub-steps of: automatically applying an initial rating using artificial intelligence; and transmitting the retrieved information to a subject matter expert (SME) for the expert to apply a rating. The expert may also annotate the information item, or provide additional information about the information item to assist any users who read the information item.

The method may include the further sub-step of using the rating applied to the information item by the SME to modify the automatic rating system. This is particularly advantageous where the automatic rating system is implemented by an Expert system, an artificial neural network, a fuzzy system, or some other adaptive intelligent system.

The step of notifying the user of retrieved information items meeting a predetermined criteria is preferably implemented using an electronic communication channel, such as electronic mail, FTP, or such like.

According to a third aspect of the present invention there is provided a method of disseminating targeted information to a plurality of users within an organization, the method comprising the steps of: receiving from each of a plurality of users, a selected subject matter of interest to that user; storing for each user the subject matter selected by that user; accessing a plurality of information sources; retrieving information items relating to any of the stored selected subject matter; for each retrieved information item, applying an importance value to that item; and notifying each user of any retrieved information items meeting a predetermined criteria.

According to a fourth aspect of the present invention there is provided a business intelligence system comprising: registering means for allowing a user to select subject matter of interest to that user; searching means for accessing different information sources and for extracting information items from these sources; evaluating means for applying an importance value to each extracted information item relating to the subject matter of interest; and notifying means for notifying the user about any information items meeting a predetermined criteria.

The registering means may be implemented by a Web browser having an interface allowing a user to enter key words or other identifiers relating to a selected subject matter.

The evaluating means may include a facility for transmitting an information item to a subject matter expert and for receiving from the subject matter expert a rating for that information item. The evaluating means may use this received rating to adapt its own rating system.

The system may be based on intelligent agents that:
1. access Web sites to identify relevant information items,
2. store the relevant information items (or data extracted from the relevant information items) in a server,
3. apply an importance value to each information item stored, and
4. allow users to access the server, for example, from a Web browser.

In one embodiment, a Java (trade mark) applet may be included in a Web browser to allow a user to subscribe to a subject matter and to view the results of the searches for information items relating to that subject matter.

According to a fifth aspect of the present invention there is provided a client-server information system, the system comprising: a client having an interface for selecting subject matter of interest to a user; and a server for retrieving information items relating to the selected subject matter; rating the retrieved information items; and notifying the user of retrieved information items meeting a predetermined criteria.

According to a sixth aspect of the invention there is provided a method of configuring an information system, the method comprising the steps of: defining a subject matter of interest; identifying sources of information; identifying infrastructures to be used; and configuring the identified infrastructures to employ resources to access the sources of information to retrieve information items relating to the subject matter of interest.

The step of defining a subject matter of interest may include the step of selecting which Web sites are to be visited to search for information items, and defining the parts of that Web site in which information items are to be searched for, and the page structure of those parts of the Web site.

The step of identifying infrastructures to be used may include the step of selecting what functions are to be performed. For example, searching for information items, rating information items, notifying users, and such like.

The step of configuring the identified infrastructures to employ resources may include how components in a system communicate with each other, what a component should do if an error occurs, and such like.

BRIEF DESCRIPTION OF THE DRAWINGS

These and other aspects of the present invention will be apparent from the following specific description, given by way of example, with reference to the accompanying drawings, in which:

FIG. 7 is an illustration of a concept hierarchy table stored in the system of FIG. 1;

FIG. 8 is an illustration of a concepts keywords table stored in the system of FIG. 1;

FIG. 9 is an illustration of a user subject matter selection table stored in the system of FIG. 1;

FIG. 10 is an illustration of a subject matter subscription table stored in the system of FIG. 1;

FIG. 13 is an illustration of a document classification table stored in the system of FIG. 1;

FIG. 14 is an illustration of a document rating table stored in the system of FIG. 1;

DETAILED DESCRIPTION

Figure 1:
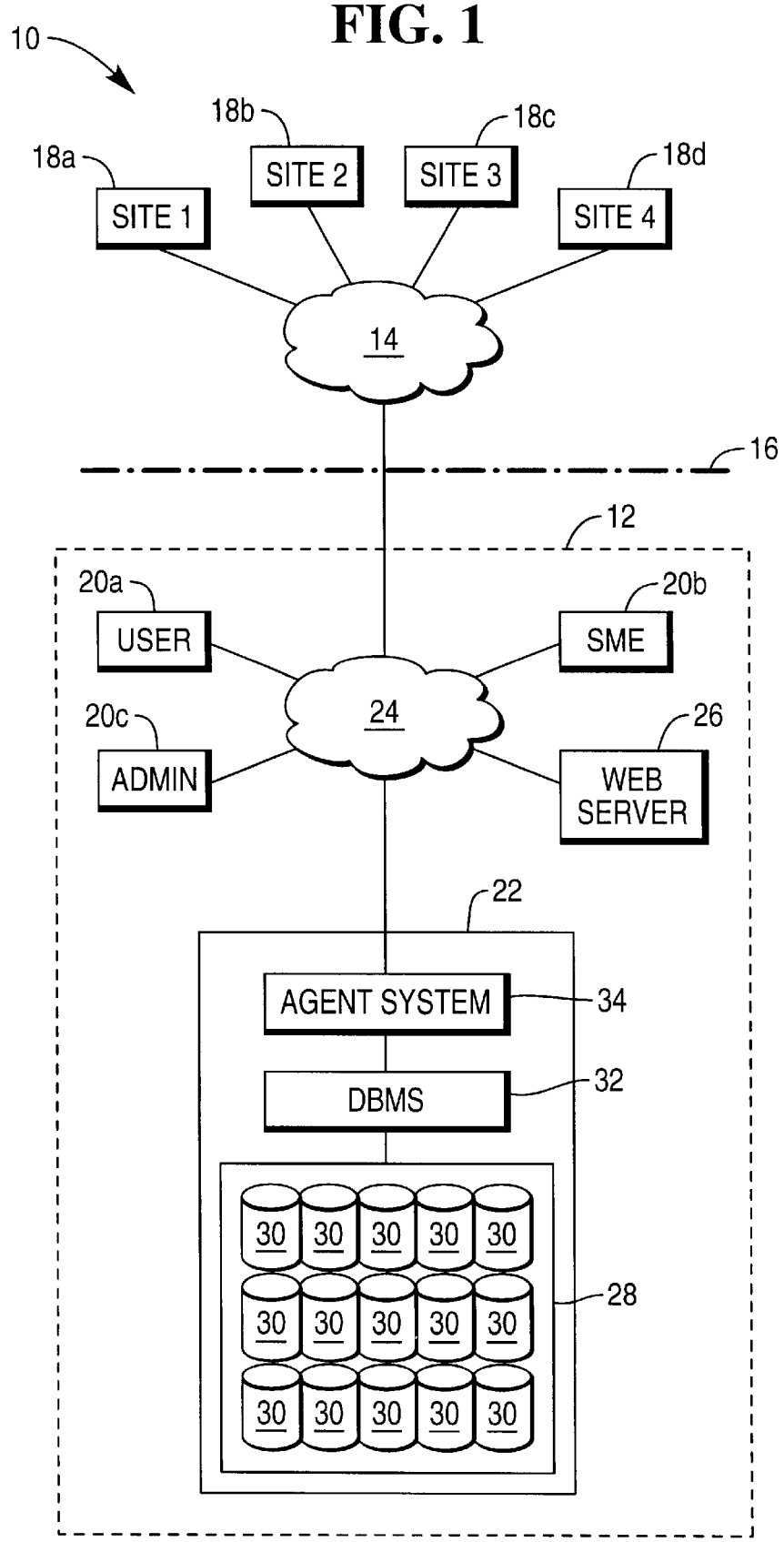
FIG. 1 is a simplified block diagram of an electronic data system including an information system according to one embodiment of the present invention.

Referring to the Figs, and particularly to FIG. 1, which shows an electronic data system 10, the system 10 comprises an information system 12 connected to the Internet 14 via a firewall 16. As is well known, a large number of Web sites 18 (only four of which are shown) are also connected to the Internet 14. These Web sites 18 are a source of information items in document form.

The information system 12 comprises client devices 20 (only three of which are shown in FIG. 1) connected to a retrieved information storage database 22 by a TCP/IP-based Intranet 24 that provides the client devices 20 with the World Wide Web facility. System 12 also comprises a Web server 26 connected to the Intranet 24.

The database 22 is in the form of a modified data warehouse and includes a data storage area 28 in the form of a large array of magnetic disk drives 30; and a database management system (DBMS) 32 that controls storage of data within, and extraction of data from, the data storage area 28. The data warehouse is a Teradata (trade mark) system available from NCR Corporation, 1700 South Patterson Boulevard, Dayton, Ohio 45479-0001, USA that has been modified to include an artificial intelligence system 34.

The artificial intelligence system 34 comprises static intelligent agents and supporting resources, and the system is based on the Aglets (trade mark) architecture, available from IBM Corporation and described at the Web page URL http://www.trl.ibm.co jp/aglets/.

Figure 2:
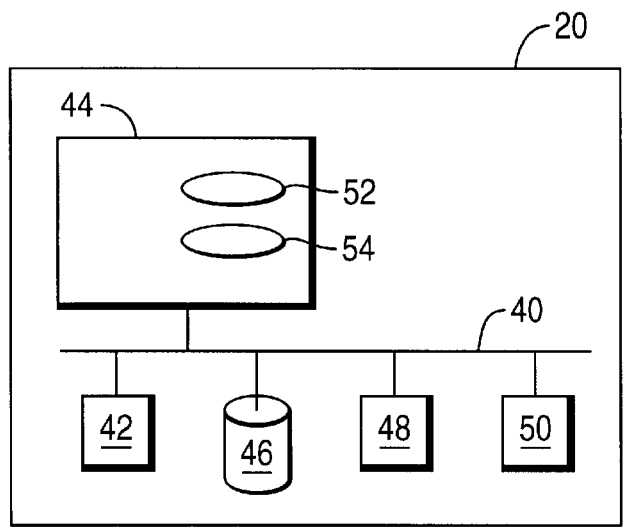
FIG. 2 is a simplified block diagram of a client device of the information system of FIG. 1.

Referring particularly to FIG. 2, each client device 20 is a conventional personal computer (PC) and, as is well known, includes a system bus 40 interconnecting a processor 42 and associated memory 44; storage means 46 in the form of a magnetic disk drive and removable media storage such as a CD ROM and a floppy disk drive; a display 48; and input means 50 in the form of a keyboard and a mouse, trackball or similar.

Although each client device 20 is identical, for clarity of illustration of this embodiment, each device 20 is shown as operated by a different type of user. Thus, device 20a is operated by a 'user' of system 12; device 20b is operated by a subject matter expert (SME) of system 12; and device 20c is operated by an administrator of system 12.

The memory 44 in each client device 20 executes an operating system kernel 52 and a Web browser 54 (or browser component), such as the Microsoft (trade mark) Internet Explorer (trade mark) Web browser.

Each client device 20 is able to access the agent system 34 by a user entering an appropriate URL (uniform resource locator) in the Web browser's URL field.

Figure 3:
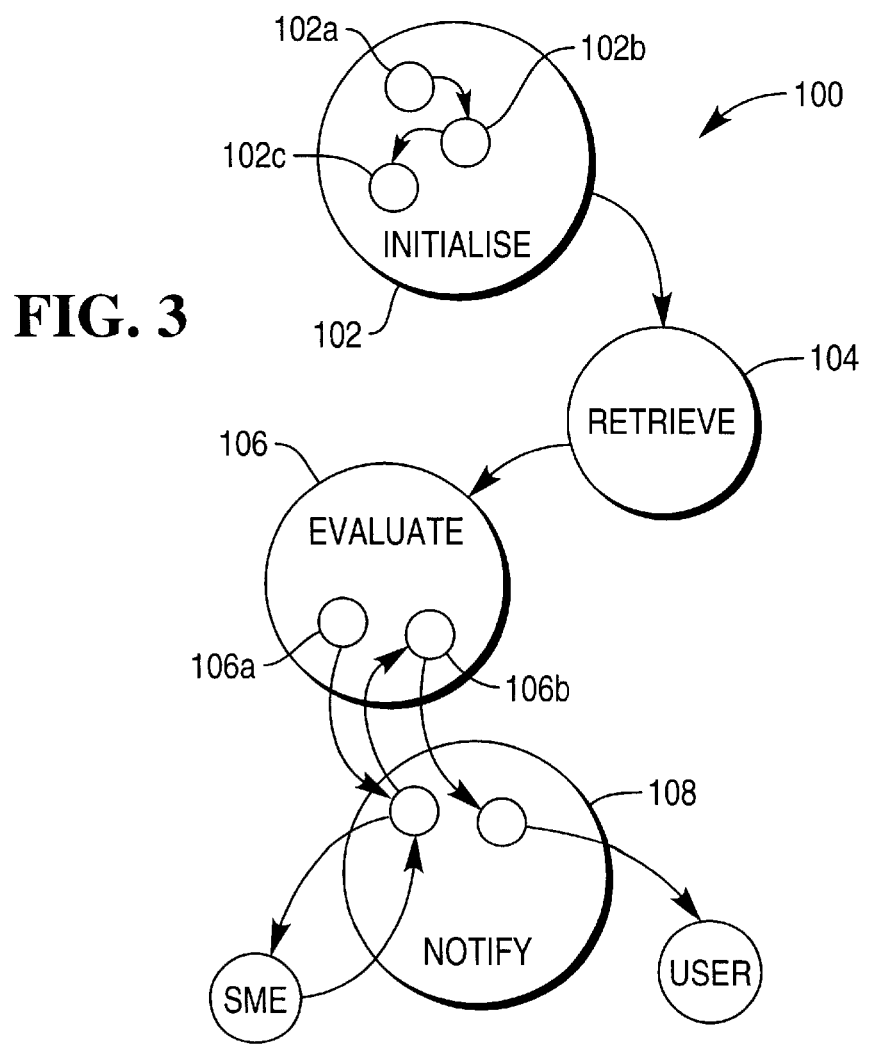
FIG. 3 is a process flow diagram illustrating the basic processes implemented by the information system of FIG. 1.

Reference is now made to FIG. 3, which is a process flow diagram indicating the basic processes 100 implemented by the information system 12 of FIG. 1. Firstly, an initialization process 102 is performed to initialize the system 12 (FIG. 1) and to allow users to select subject matter of interest to them. Secondly, a retrieval process 104 is performed to retrieve information items from information sources. Thirdly, an evaluation process 106 is performed to rate the importance of the information items retrieved. Fourthly, a notification process 108 is performed to notify individuals of any important information items.

Figure 4:
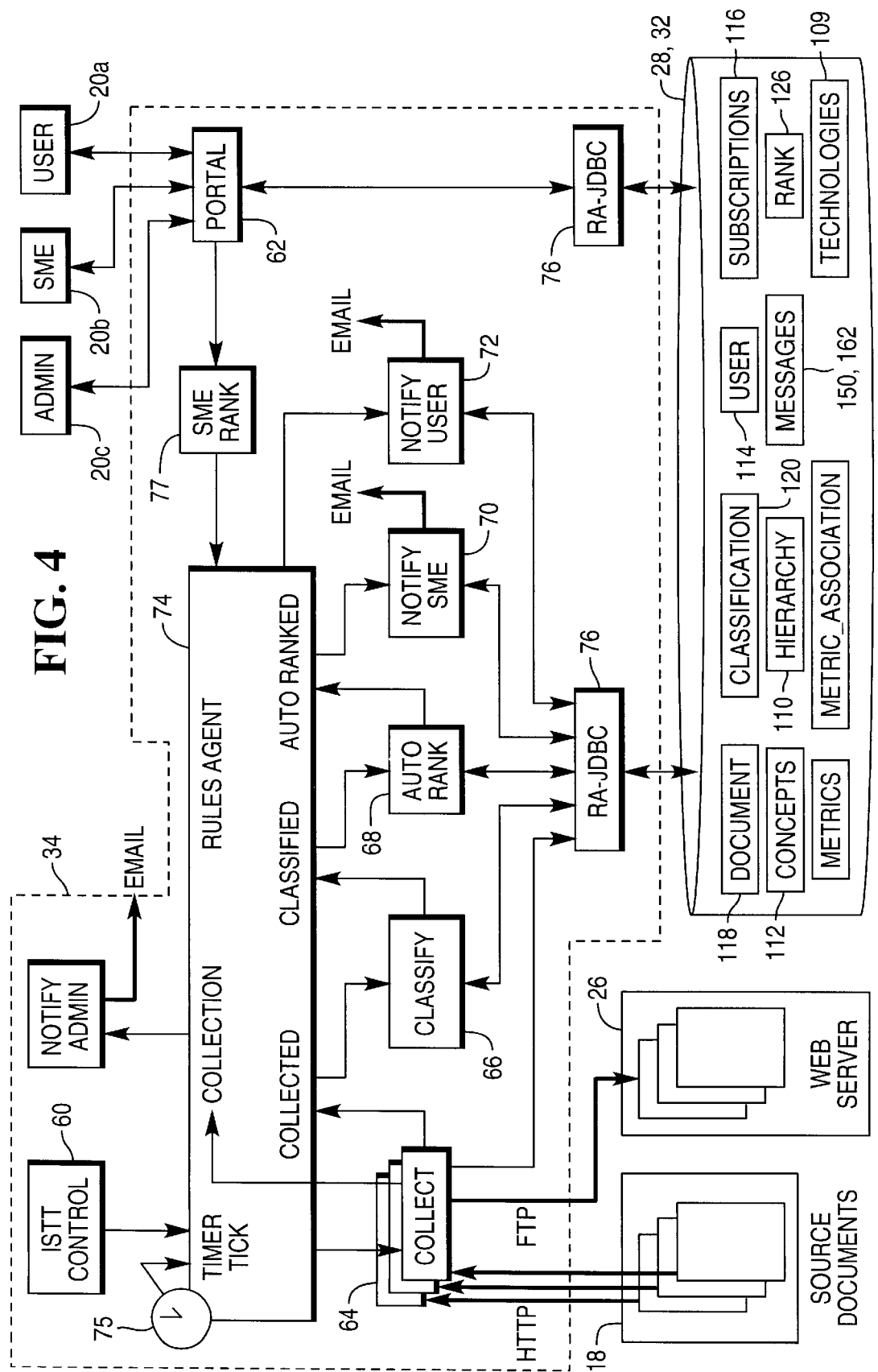
FIG. 4 is a block diagram illustrating the architecture of the information system of FIG. 1.

To describe these four processes (102 to 108), reference is also made to FIG. 4, which is a block diagram illustrating the architecture of the information system of FIG. 1.

As illustrated in FIG. 4, the agent system 34 comprises a control component 60, a subject matter selection component 62, an information items retrieval component 64, a classifying component 66, a rating component 68, a feedback request component 70, a notification component 72, a management component 74, and a database access component 76.

The control component 60 is a program that initiates operation of the management component 74. The management component 74 is in the form of a rules-based program that manages the work flow between various components (64 to 72) in the agent system 34.

Initialization Process

The initialization process 102 involves three distinct sub-processes: an administrator sub-process 102a, a subject matter expert sub-process 102b, and a user sub-process 102c.

The administrator sub-process 102a involves an administrator using a client device 20c (FIG. 1) to access the subject matter selection component 62, which is in the form of a Web portal.

In this embodiment, the information items to be retrieved and rated relate to types of technologies (displays, processors, memories, and such like). The administrator creates a list of technologies and stores this list as a technologies table 109 in the data storage area 28. This technologies table 109 is accessed by a user interface program (described in more detail below).

The administrator selects the Web sites that will be searched for information items, and configures the information items retrieval component 64 to retrieve items from these Web sites.

The information items retrieval component 64 is an intelligent agent component that sends HTTP requests to the preselected Web pages.

For each Web site to be examined for information, the administrator configures the retrieval agent 64 with the URL for the Web site, the Web site hierarchy, and the page format of the page to be examined. Typically, the retrieval agent 64 is provided with the URL for a Web site's news page, and is provided with the tag below which the news items appear. The tag is typically different for each Web site, but may be an image with the word "NEWS" appearing on it.

Once the administrator has configured the retrieval agent 64, the agent 64 can make an HTTP request to the URL having the Web page with the latest news, and can strip off and discard all parts of the page except the text following the news tag.

The SME sub-process 102b involves a human SME subscribing to certain concepts. The SME also uses a client device 20b (FIG. 1) to access the Web portal 62.

Figure 5:
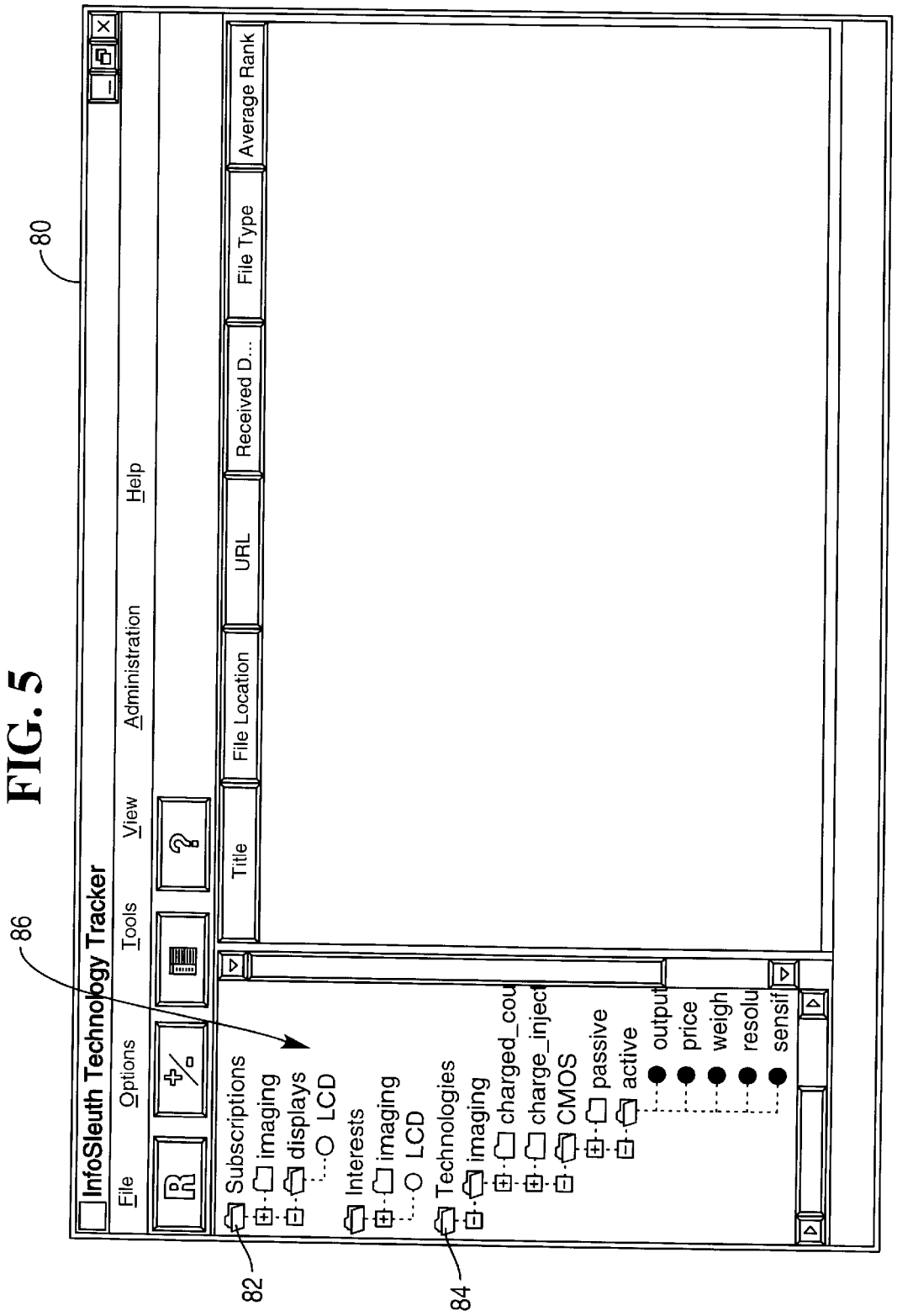
FIG. 5 is a pictorial representation of a user interface presented to a subscriber of the system of FIG. 1.

Referring also to FIG. 5, which is a diagrammatic representation of a user interface 80 presented to an SME at client device 20b, the SME is provided with a graphical interface 80 listing subscription information 82 selected from a hierarchical list 84 of available technologies on a window pane 86.

The SME is able to add more concepts to this subscription list 82, selected from the technologies list 84. Any concepts the SME adds are identified as being 'owned' by that SME, so that the system 12 will request that expert to rate any retrieved information items relating to that concept.

In this embodiment, the SME has added the concept 'Displays: LCD", and the keywords 'liquid AND crystal AND display'. Thus, the SME is an SME for any information items that relate to LCD displays.

When an SME subscribes to a concept, the SME enters a threshold value for that concept, so that any document relating to that concept that does not have an importance value (a rating) exceeding the threshold value set by the SME will not be notified to the SME.

Once the SME has subscribed to those concepts in which he/she is expert, the Web portal 62 updates the data storage area 28 (FIG. 1) with these details.

If an expert wishes to add a concept that does not appear in the list of technologies, then the expert can contact the administrator to have the concept added to the technology list.

The user sub-process 102c is the third sub-process in the initialization process 102 and may occur at any time after the previous two sub-processes have been completed. The user sub-process 102c involves a user selecting subject matter of interest to him. To do this, the user also uses a client device 20a (FIG. 1) to access the Web portal 62 and register his preferences.

Figure 6:
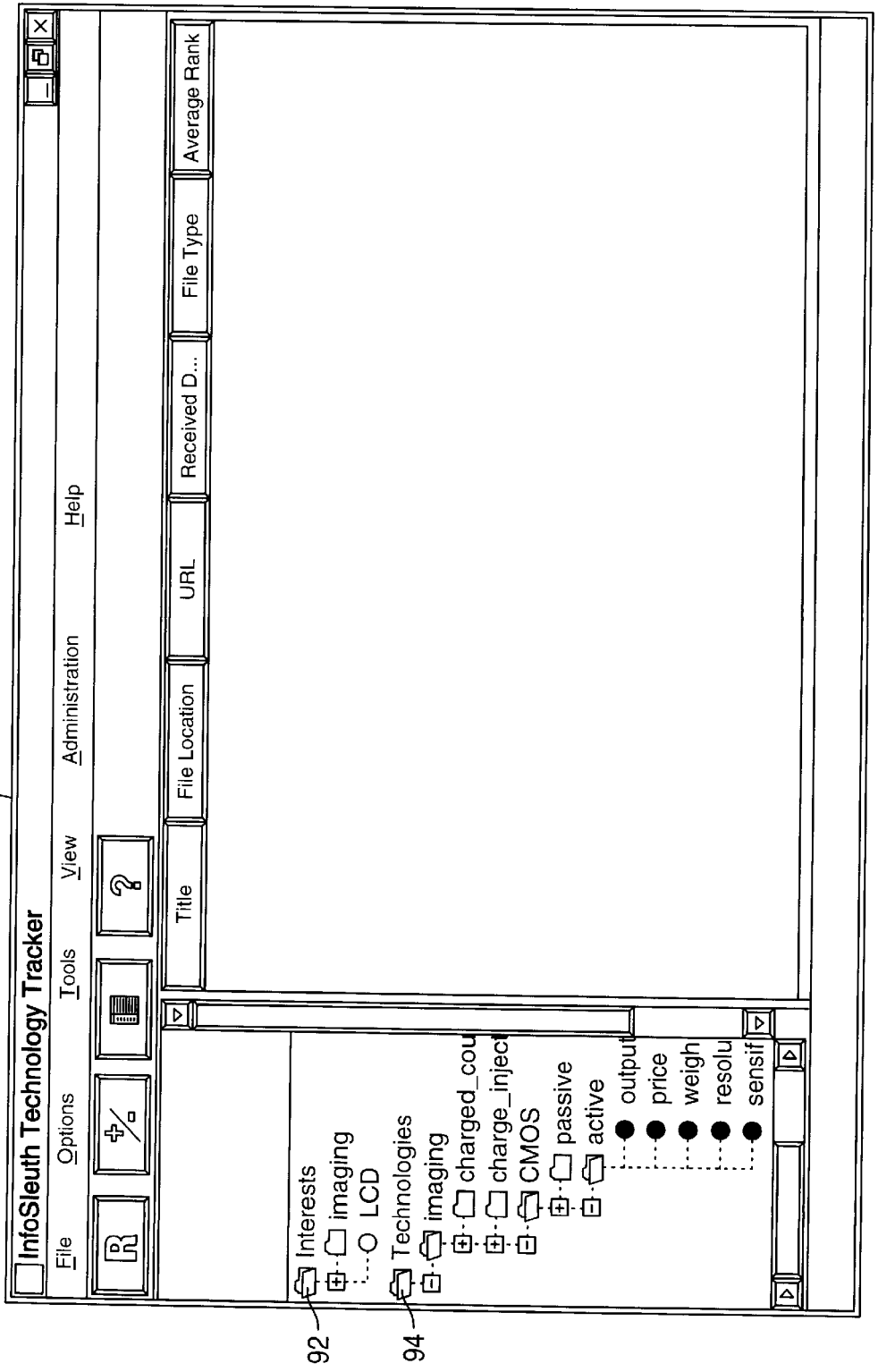
FIG. 6 is a pictorial representation of a user interface presented to a user of the system of FIG. 1.

Referring also to FIG. 6, which is a diagrammatic representation of a user interface presented to the user at client device 20a, the user is provided with a graphical interface 90 having a list 92 of subject matter of interest to the user which is selected from a list 94 of technologies.

The user is also able to enter an interest value for each subject matter of interest to him. The interest value is a number between 1 and 100 and represents the rating that an information item must receive before the user is to be notified about the item.

Once the user has selected those concepts of interest to him (from the list of technologies) and assigned an interest value to each, the Web portal 62 updates the data storage area 28 (FIG. 1) with these details. The portal 62 transfers the update data via the database access component 76 (in the form of a JDBC agent) and the DBMS 32.

Thus, at the end of the initialization process, data storage area 28 stores a concepts hierarchy table 110 and a concepts keywords table 112, as illustrated in FIGS. 7 and 8 respectively. These tables 110, 112 contain hierarchy and keyword information respectively relating to all the subjects to which an expert has subscribed. Each concept is defined by a superclass and a subclass, as shown in FIG. 7. Each superclass-subclass concept may have a plurality of keywords associated with it; thus, keyword table 112 has three entries for the "Displays: LCD" superclass-subclass combination, as shown in FIG. 8.

Data storage area 28 also stores a user table 114, as illustrated in FIG. 9, and a subscriptions table 116, as illustrated in FIG. 10.

For each user, the user table 114 stores a user identifier in a user identification column 114a; the concepts (superclass-subclass combination) in which the user is interested, in a concepts column 114b; and the user selected interest value, in interest value column 114c; where a user is interested in multiple concepts, there is a row entry for each concept, as shown in FIG. 9.

For each SME, the subscriptions table 116 stores an SME identifier in an SME identification column 116a, the concepts (superclass-subclass combinations) to which the SME has subscribed in an SME concepts column 116b, and the threshold value for each concept in a threshold column 116c.

It will be appreciated, however, that the user can access this portal 62 at any time to change his/her subject matter of interest and/or interest value for a selected subject matter. Similarly, the administrator can access the portal 62 to reconfigure the system; and the SME can update his subscriptions at any time.

Although only one SME has been described, system 12 typically will have a plurality of SMEs who subscribe, so that there are many different concept subscriptions. Similarly, although only one user has been described, system 12 typically will have a large number of users, each having an interest in a specific subject matter.

Retrieval Process

Figure 11:
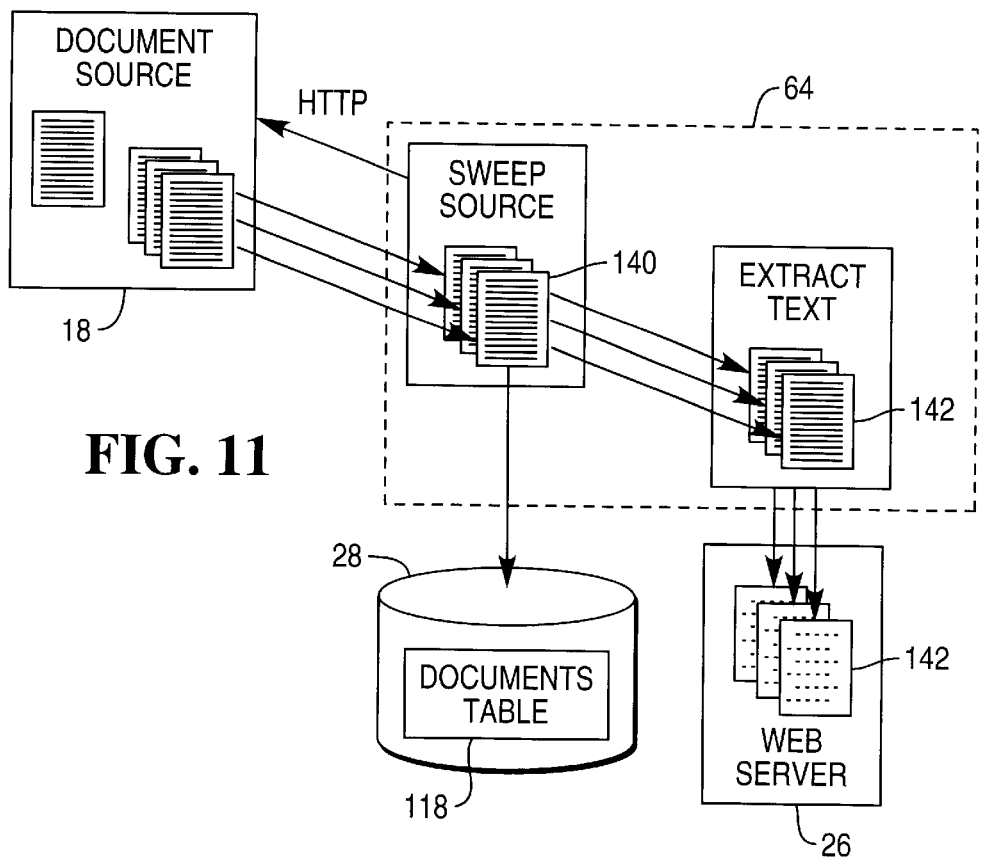
FIG. 11 is a simplified block diagram illustrating a retrieval component of the system of FIG. 1 in operation.

The retrieval process 104 will now be described in more detail with reference to FIG. 11. The retrieval agent 64 is activated periodically by the management program 74 (which includes a timer 75). The retrieval agent 64 sends HTTP requests to the Web site addresses 18 which the administrator loaded into the agent in sub-process 102a.

The retrieval agent 64 receives Web pages 140 (information items) in response to the HTTP requests. The agent 64 then extracts the text from these pages 140 by identifying the tag (loaded by the administrator in sub-process 102a) and copying the text beneath the tag to a new document 142 (which is also an information item). The tag may be a graphic having the letters "News" or "Latest Information" or "Updated Information" displayed on it, and typically varies from Web site to Web site. The rest of the retrieved Web page is deleted.

The retrieval agent 64 saves document indexing information relating to the retrieved Web page in the data storage area 28 in a documents table 118. The document indexing information includes the Web page URL, the date the document was retrieved, the document title (if available), and the document author (if available).

The retrieval agent 64 also stores the new document 142 (an information item) containing the extracted text on the Web server 26.

Evaluation Process 106—First Stage

Figure 12:
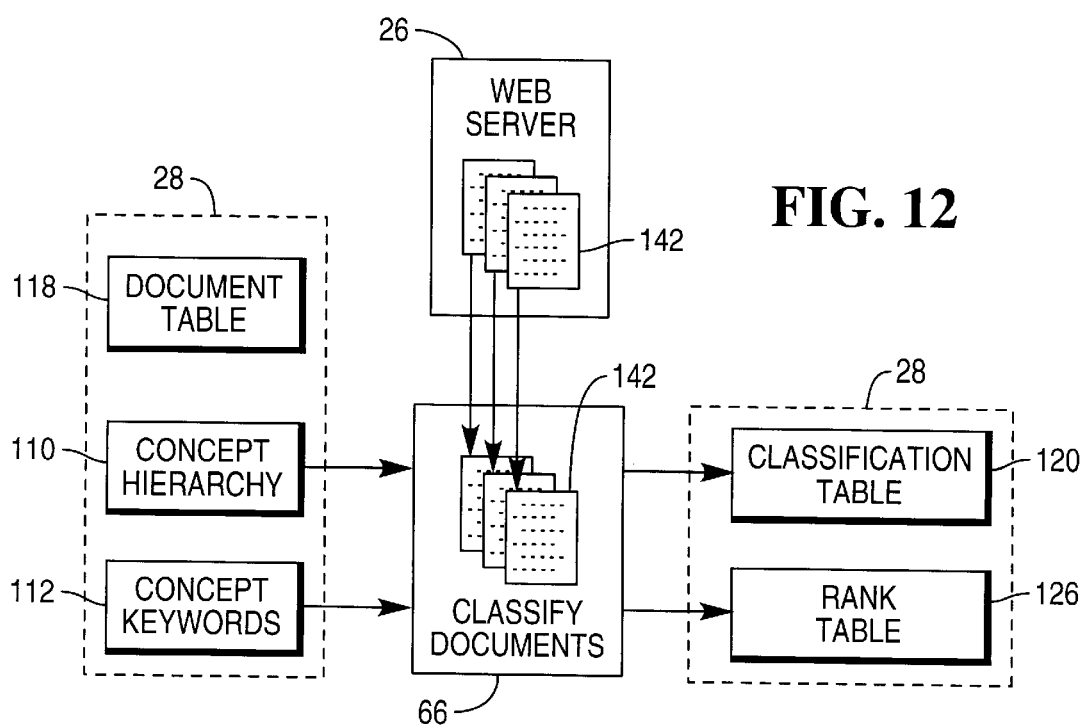
FIG. 12 is a simplified block diagram illustrating a classifying component of the system of FIG. 1 in operation.

Once an information item 142 has been stored on the Web server 26, the classifying component 66 evaluates the item 142, as will be described with reference to FIG. 12.

The classifying component 66 is an intelligent agent that includes rules for examining text contained in item 142 and determining whether the text contains any of the stored concepts and keywords. Thus, each information item is examined for each concept and keyword stored in the concept hierarchy table 110 and the concept keyword table 112.

If an information item does not contain any of the concepts or keywords stored in the respective tables 110, 112, then the information item is deleted.

If an information item does contain one or more of the concepts and/or keywords stored in tables 110, 112, then an entry for that item is made in a classification table 120 for every concept contained in the information item, as illustrated in FIG. 13.

In FIG. 13, classification table 120 has a document reference column 120a and a technology concept column 120b. When the classifying agent 66 detects a concept in the information item 142, the agent 66 creates an entry in the table 120 for that concept. The entry has an identification number in reference column 120a and the concept description in concept column 120b.

In this embodiment, item 142 relates to LCD displays and CRT displays. Thus, the classifying agent 66 gives the item 142 a unique identification 122 (the reference number #1234), and creates one entry 122a (via the DBMS 32 and JDBC agent 76) for this item 142 having the technology concept "Displays: LCD" 124a; and a second entry 122b for this item 142 having the technology concept "Displays: CRT" 124b.

In general, there will be an entry for each concept described in the item, so that one item may have multiple entries in the classification table 120.

Once the item 142 has been classified, it is then rated for importance by the rating component 68, which is an intelligent agent implementing an automatic ranking routine.

There are two stages to the rating process. Initially, an item is rated automatically by the rating agent 68 (process 106a). However, there is a feedback rating process, in which an SME is asked to rate the item, and the SME's rating is used to modify the initial rating (process 106b).

The initial rating (process 106a) will now be described.

To rate an item automatically, the rating agent 68 uses the classification table 120, algorithms such as those used in conventional Internet search engines, and any feedback information it has received, to determine the relevance of the item 142.

For each row in classification table 120 having a reference to item 142, the rating agent 68 reads the corresponding entry in the concept column 120b, and applies the conventional rating algorithms to produce a rating value.

The rating agent 68 then creates entries in a rating table 126 to store the rating values for the items evaluated, as illustrated in FIG. 14. Rating table 126 has a reference column 126a and a technology concept column 126b (which reproduce the data of the classification table 120), in addition to a rating column 126c and rater column 126d. The rating column 126c contains the rating value for that item/concept combination; and the rater column 126d indicates whether the rating was determined automatically by the rating agent 68 or by an SME.

Notification Process

The notification process involves two sub-processes: an SME notification process and a user notification process.

SME Notification Process

Once the rating agent 68 has rated the entries in the classification table 120 and entered the rating values in the rating table 126, the feedback request component 70 determines whether to send requests to SMEs.

Figures 15, 16:
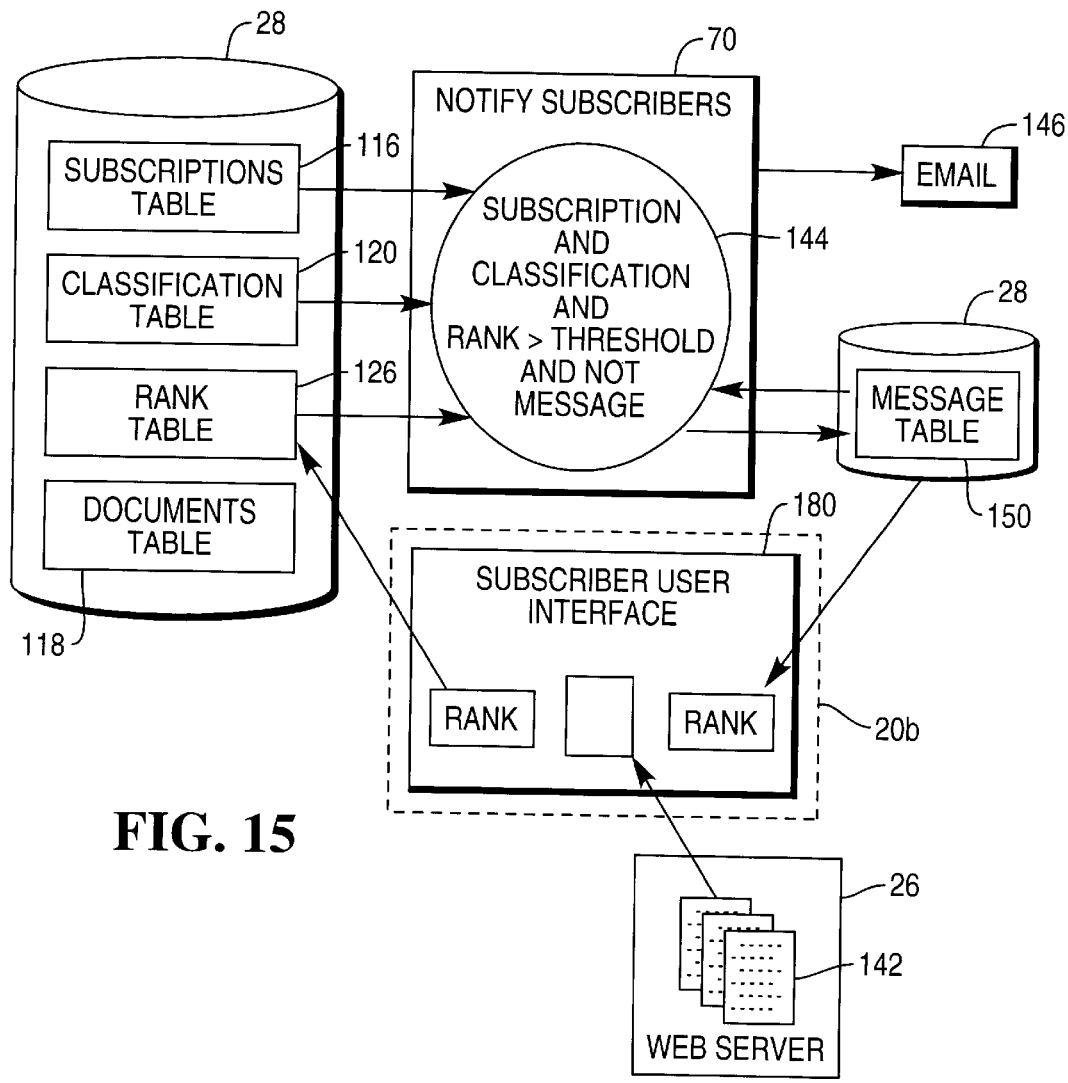
FIG. 15 is a simplified block diagram illustrating a feedback request component of the system of FIG. 1 in operation.
FIG. 16 is an illustration of a subject matter messages table stored in the system of FIG. 1.

The feedback request component 70 is an intelligent agent implementing a Boolean logic algorithm 144, as illustrated in FIG. 15.

Information item 142 relates to two concepts (Displays: LCD, and Displays: CRT), so there are two row entries 128a,b in rating table 126 for item 142.

The feedback agent 70 reads the first row 128a to determine the document reference (column 126a), the concept (column 126b), and the document rating (column 126c). The feedback agent 70 then accesses the subscriptions table 116 (FIG. 10) to determine the SME responsible for that concept. In row 128a, the concept is "Displays: LCD" (column 126b), so the identity of the SME for that concept (from column 116a of the subscriptions table 116) is "ds56743".

The feedback agent 70 then reads the threshold value set by the SME from column 116c. For this concept ("Displays: LCD"), the SME has set a threshold value of 60%. Thus, only items retrieved by the system 12 having an automatic rating exceeding 60% are to be notified to the SME.

As the automatic rating (from row 128a and column 126c) for this item 142 is 80% (which is greater than the threshold value of 60% set by the SME for the "Displays: LCD" concept), the Boolean logic algorithm 144 within the feedback agent 70 determines that the SME identified by the code "ds56743" is to be notified of the item 142 in relation to "Displays: LCD".

As the automatic rating (from row 128b and column 126c) for this item 142 is only 45% for the "Displays: CRT" concept, the Boolean logic algorithm 144 within the feedback agent 70 determines that the SME identified by the code "ds56743" is not to be notified of the item 142 in relation to "Displays: CRT". This is because 45% is less than the threshold value of 48% set by the SME for the "Displays: CRT" concept.

Prior to notifying the SME about this item 142 in relation to "Displays: LCD", however, the feedback agent 70 access an SME message table 150 (FIG. 16) to ensure that the agent 70 has not already notified the SME about this item for this concept.

The message table 150 has a document reference column 150a, a concept column 150b, an SME identifier column 150c, and a rated column 150d.

If the SME has not already been notified of the item (that is, the rated column is blank), then the feedback agent 70 triggers an automatic email notification 146 that sends a one-line message to the SME indicating that a new item 142 relating to "Displays: LCD" has been retrieved. The feedback agent 70 may use the SME's identifier ("ds56743") to determine the SME's email address.

If the SME has already been notified, then the agent 70 may send an automatic reminder to the SME.

Evaluation Process—Second Stage

The second stage in the evaluation process involves the SME applying a rating to the item 142.

Figure 17:
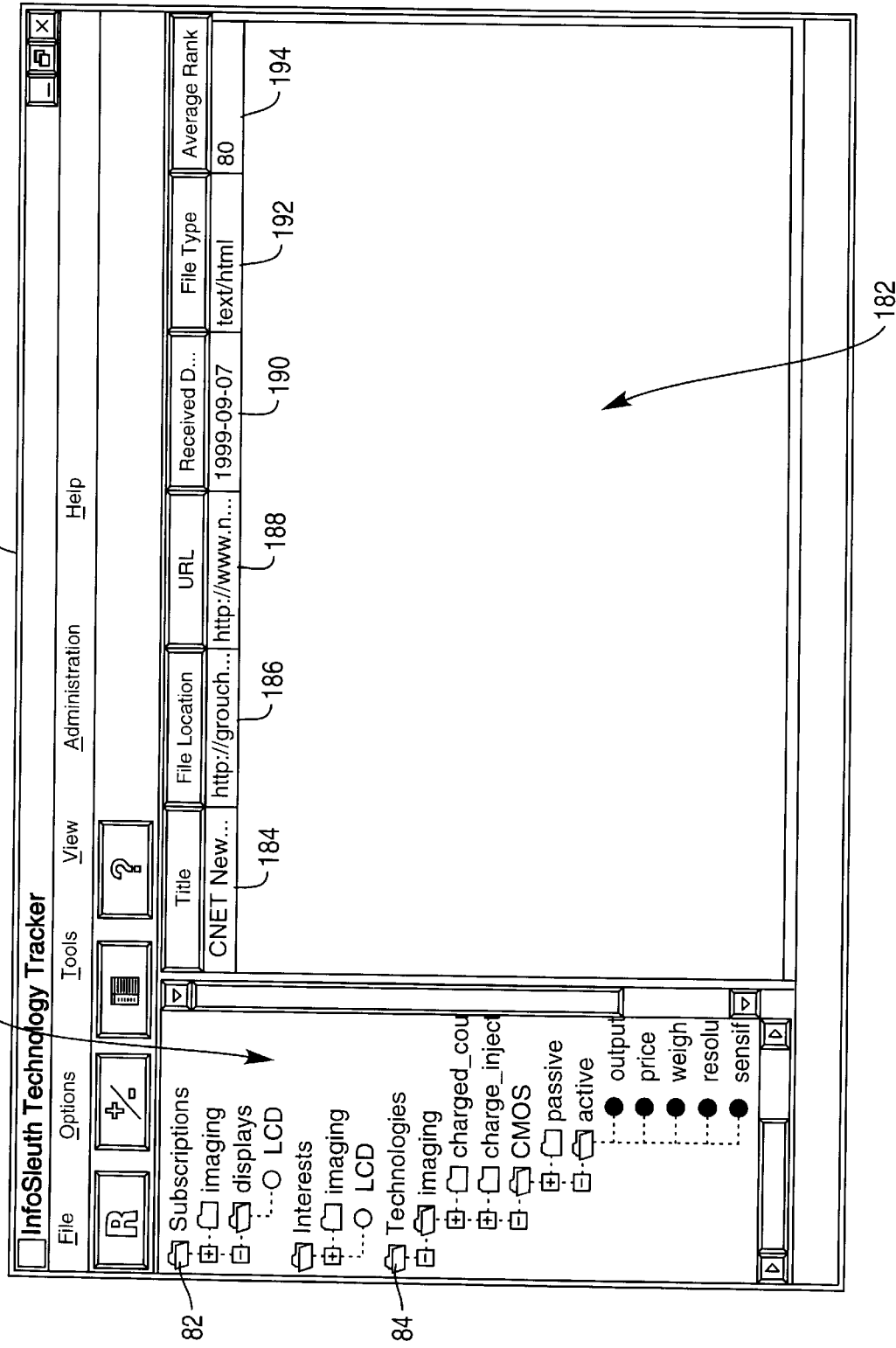
FIG. 17 is a pictorial representation of a user interface presented to a subscriber of the system of FIG. 1 when an information item is to be rated by the subscriber.

Referring now to FIG. 17, when the SME receives the email 146, the SME launches the user interface 180 at client device 20b. The user interface 180 is the same program as user interface 80, listing subscription information 82 selected from a hierarchical list 84 of available technologies on a window pane 86; but now having a right side window pane 182 including details about item 142.

These details include, the name of the Web site 184 from which item 142 was retrieved, the location 186 of the item on the Web server 26, the URL of the Web page from which the item was extracted 188 (so that the SME can look at the item as originally displayed), the date the item was retrieved 190, the type 192 of file (text, html, or such like), and the rating 194.

The SME can read the item 142 by opening the document stored on the Web server 26.

Once the SME has read the item 142, he then applies a rating to the item 142 based on his knowledge of the subject matter and his opinion of the importance of the item 142; in this example, the SME applies a rating of 76%.

When the SME applies a rating, the user interface program 180 conveys the SME's rating to portal 62, which conveys the rating to SME rating component 77 and to the JDBC agent 76. The JDBC agent 76 updates the rated column 150d in message table 150 to indicate that the item 142 has been rated by the SME.

Figure 18:
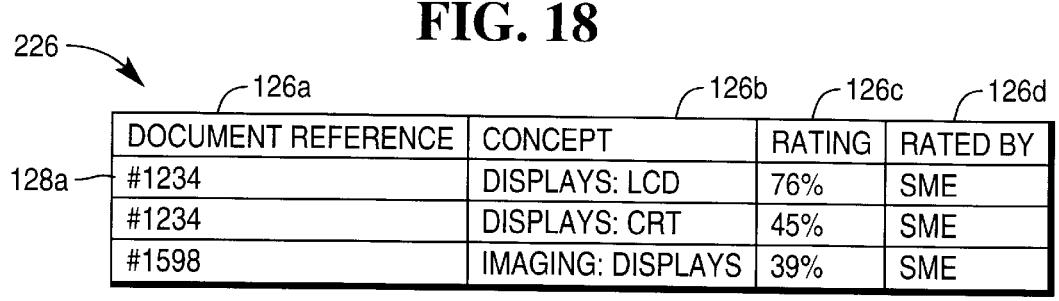
FIG. 18 is an illustration of a document rating table having been updated by a subscriber and stored in the system of FIG. 1.

The SME rating component 77 is an intelligent agent that updates the rating value in the rating column 126c of rating table 126, and updates the rater column 126d to indicate that the rating has been applied by an SME. The updated rating table 226 is shown in FIG. 18.

The SME rating component 77 also provides feedback information to the rating agent 68, which the rating agent 68 uses to improve future automatic ratings.

Once the SME rating has been applied, the evaluation process is complete.

User Notification Process

When an SME rating has been applied to the item 142 in relation to the "Displays: LCD" concept, then the notification component 72 determines whether to notify interested users or not.

Figure 19:
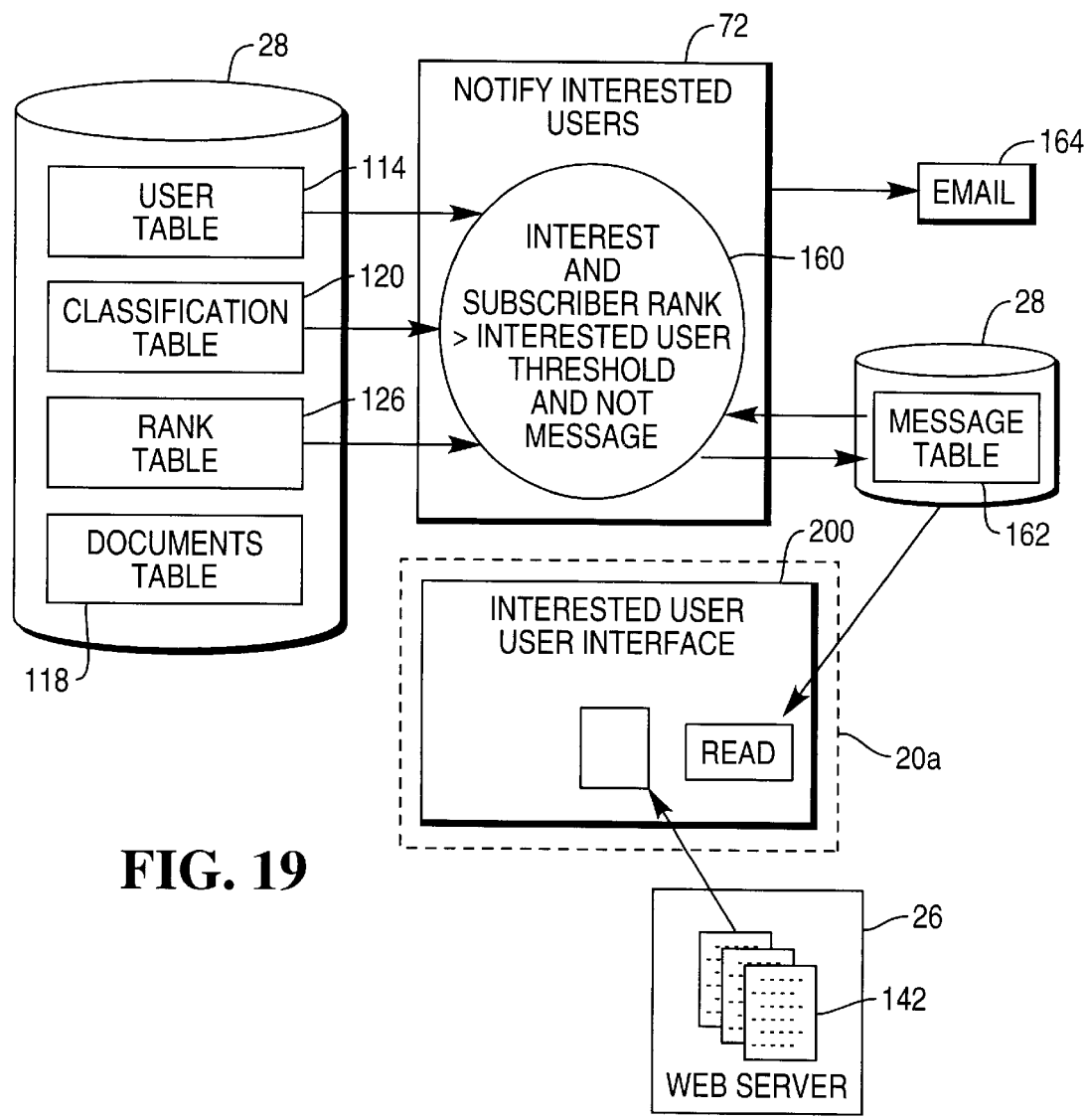
FIG. 19 is a simplified block diagram illustrating a notification component of the system of FIG. 1 in operation.
Figure 21:
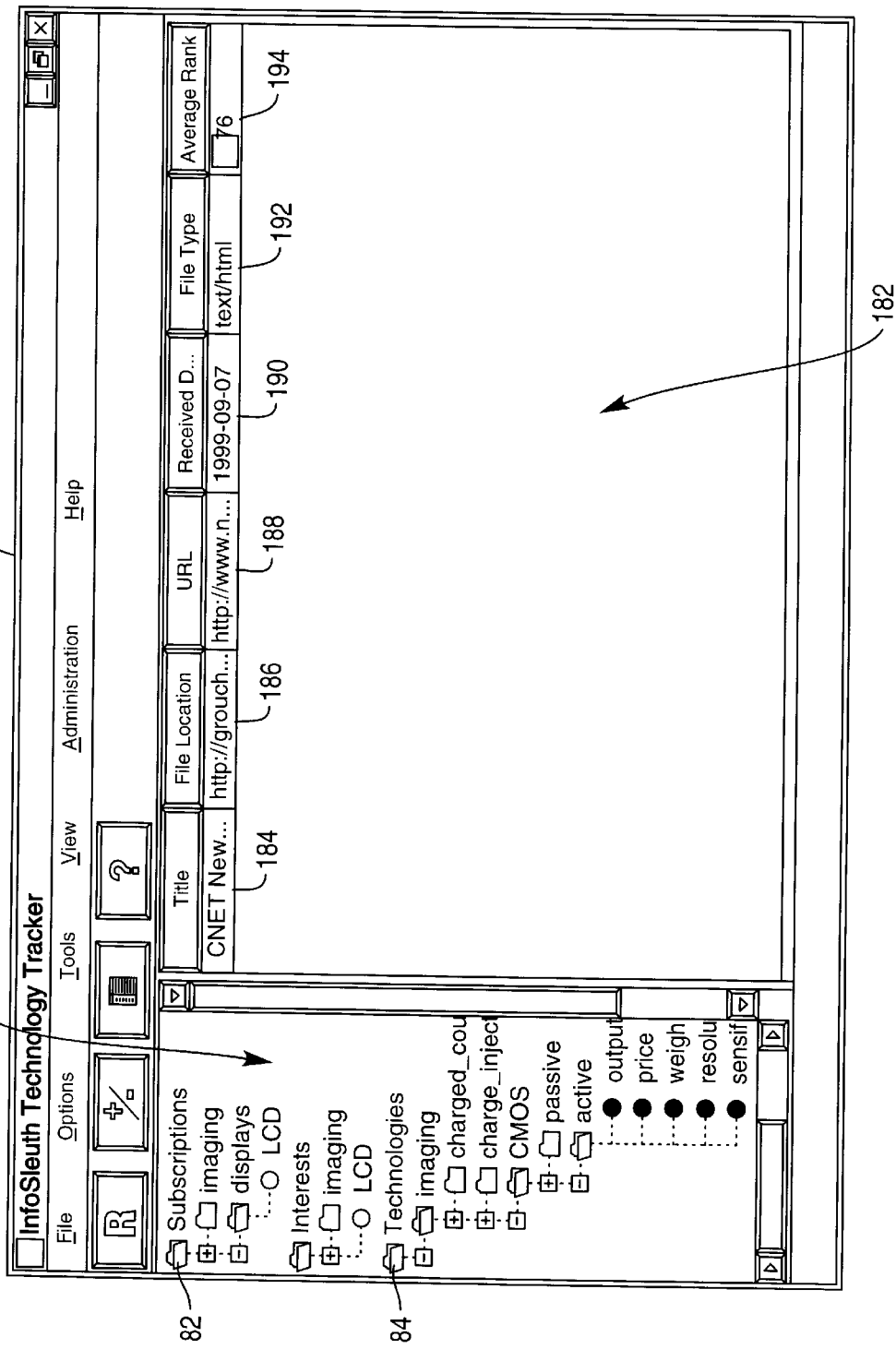
FIG. 21 is a pictorial representation of a user interface presented to a user of the system of FIG. 1 when an information item is deemed to be of interest to the user.

The notification component 72 is an intelligent agent implementing a Boolean logic algorithm 160, as illustrated in FIG. 19.

The notification agent 72 reads the first row 128a of the updated rating table 226 (FIG. 18) to determine the document reference (column 126a), the concept (column 126b), and the document rating (column 126c). The notification agent 72 then accesses the user table 114 (FIG. 9) to determine the users who are interested in that concept.

In user table 114, there are two users who are interested in the concept "Displays: LCD", "rm78343" and "mc34321". For each of these users, the notification agent 72 determines the respective interest value from column 114c, and compares these values with the rating values from column 126c of the updated rating table 226 (FIG. 18).

From column 114c of the user table 114 (FIG. 9), it is clear that user "rm78343" is only interested in items having a rating exceeding 52%, and user "mc34321" is only interested in items having a rating exceeding 81%.

As the SME rating (from column 126c of the updated rating table 226 (FIG. 18)) for this item 142 is 76% (which is greater than the interest value of 52% set by user "rm78343", but less than the interest value of 81% set by user "mc34321"), the Boolean logic algorithm 144 within the notification agent 72 determines that user "rm78343" should be notified but user "mc34321" should not be notified of the item 142 in relation to the concept "Displays: LCD".

Figure 20:
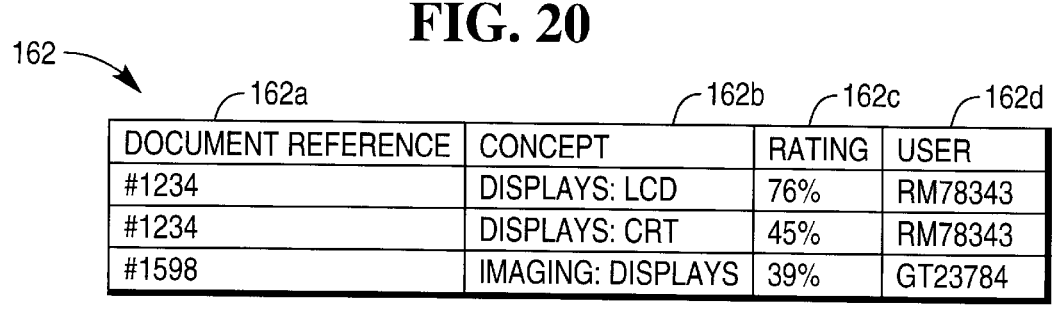
FIG. 20 is an illustration of a user messages table stored in the system of FIG. 1.

Prior to notifying user "rm78343" about this item 142, however, the notification agent 72 accesses a users message table 162 (FIG. 20) to ensure that the agent 72 has not already notified user "rm78343" about this item 142.

The message table 162 has a document reference column 162a, a concept column 162b, a rating column 162c, and a user identifier column 162d.

If the user has not already been notified of the item, then the notification agent 72 triggers an automatic email notification 164 that sends a one-line message to the user indicating that a new item 142 relating to "Displays: LCD" has been retrieved. The notification agent 72 may use the user's identifier ("rm78343") to determine the user's email address.

When the user receives the email 164, the user launches the user interface 280 at client device 20a. The user interface 280 is the same program as user interfaces 80 and 180, having the same fields as these interfaces 80,180 but showing the SME rating of 76% in rating field 194.

The user can read the item 142 by opening the document stored on the Web server 26.

Figure 22:
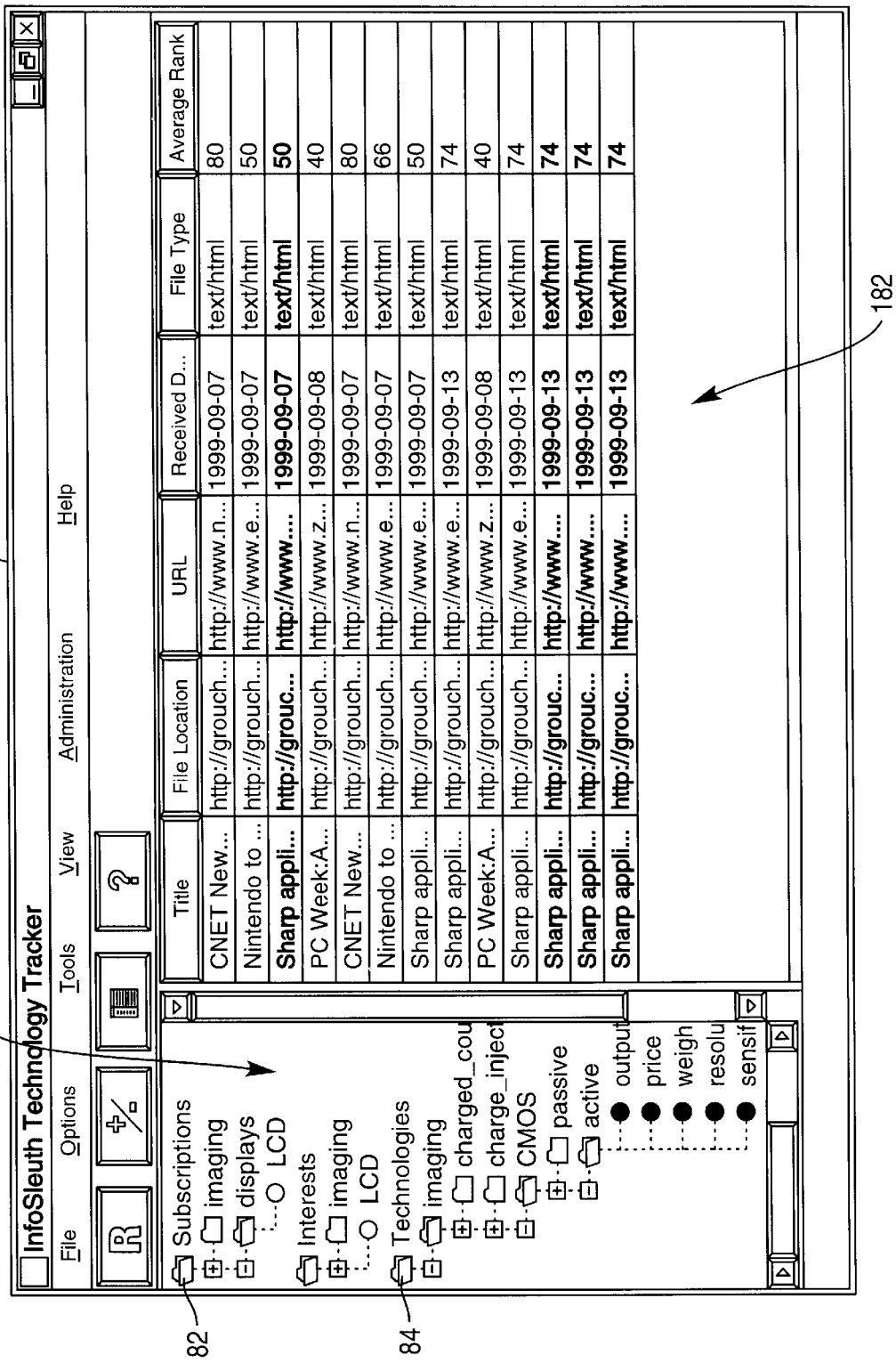
FIG. 22 is a pictorial representation of a user interface presented to a user of the system of FIG. 1 after a large number of information items have been retrieved, classified, and stored.

After a period of time, a vast number of items will have been retrieved, classified, and stored as information items, so that the user interface 380 (FIG. 22) can be used to review all of the information items available relating to any given concept within the concept hierarchy 84.

It will be apparent that this embodiment of the present invention provides an automated search, classification, and notification system that allows SMEs to participate in rating the importance of documents to a specified subject matter, so that individuals within an organization can access this system and refer to only the most important documents. As a two-stage rating is applied, one by the system and another by a person (the SME), the system is able to adapt its rating mechanism by comparing its rating value with that of the SME. In effect, this allows an SME to train the system in evaluating the importance of documents relating to the subject matter.

As the system uses distributed agent-based technologies, the system is easy to scale across a large organization, and is able to classify on-line information and to alert interested users in real time.

Various modifications may be made to the above described embodiment, within the scope of the present invention, for example, other data storage systems may be used than the data warehouse described. In other embodiments, the artificial intelligence system may not be based on intelligent agent infrastructures, for example, it may be based on an expert system, or may be coded as a conventional computer program. Although all the concepts and hence the information items described in this embodiment relate to technologies, in other embodiments, the concepts may relate to other areas, for example, law, medicine, business, commerce, or such like. In the above embodiment, experts subscribe to concepts and users register interest in concepts; however, it will be appreciated that experts may also be users for subject matter for which they are not expert. In other embodiments, there may not be an SME available for a particular concept; in such an embodiment, a user may receive notification of an item that has only been rated by the rating means, not by an SME.

What is claimed is:

1. An information system comprising:

means for selecting one or more subject matter areas of interest to one or more users;

means for searching for information items likely to relate to one or more of the selected subject mailer areas;

means for retrieving information items considered likely to relate to one or more of the selected subject matter areas;

means for classifying information items to identify information items relating to the selected subject matter;

means for rating the identified information items; and means for notifying the user about identified information items meeting a predetermined criteria.

2. A system according to claim 1, wherein the means for selecting subject matter of interest to a user includes means for allowing a user to select an interest value, so that only those information items rated above that interest value will be notified to the user.

3. A system according to claim 1, wherein the means for retrieving information items retrieves items prior to the means for classifying items classifying the retrieved items.

4. A system according to claim 1, wherein the means for retrieving information items is activated at regular intervals so that data sources are checked for relevant information on a regular basis.

5. A system according to claim 1, wherein the means for retrieving information items includes an extraction routine for extracting text from the information items.

6. A system according to claim 1, wherein the means for rating the identified information items is implemented automatically by an artificial intelligence system.

7. A system according to claim 1, wherein the notifying means includes a comparing routine for determining whether a retrieved information item exceeds a predetermined threshold.

8. A system according to claim 1, further comprising feedback request means for requesting a subject matter expert to apply a rating to the retrieved information items.

9. A system according to claim 1, wherein the rating means includes a feedback routine whereby the rating means automatically applies an initial rating using artificial intelligence, receives a rating applied by a subject matter expert, and modifies the rating process to approximate closer to the rating of the expert.

10. A method of collecting selected information, the method comprising the steps of:

identifying one or more subject matter areas of interest to one or more users;

searching for information items likely to relate to one or more of the identified subject matter areas;

retrieving information items considered likely to relate to one or more of the identified subject matter areas;

rating the retrieved information items; and notifying the user of retrieved information items meeting a predetermined criteria.

11. A method according to claim 10, wherein the step of retrieving information items relating to the identified subject matter includes the steps of:

identifying a plurality of sources of information;

accessing each of the plurality of sources of information; and for each source of information, extracting any information items that are more recent than the information items retrieved on a previous visit to the information source.

12. A method according to claim 10, wherein the step of rating the retrieved information items includes the steps of:

automatically applying an initial rating using artificial intelligence; and transmitting the retrieved information items to a subject matter expert for the expert to apply a rating.

13. A method according to claim 12, wherein the step of rating the retrieved information items includes the step of:

using the rating applied to the information item by the subject matter expert to modify the automatic rating step.

14. A method of disseminating targeted information to a plurality of users within an organization, the method comprising the steps of:

receiving from each of a plurality of users, a selection entry identifying one or more subject matter areas of interest to that user;

storing for each user an identification of the one or more subject matter areas selected by that user;

searching a plurality of information sources for information items likely to relate to the selected subject matter areas;

retrieving information items relating to any of the selected subject matter areas;

for each retrieved information item, applying an importance value to that item; and notifying each user of any retrieved information items meeting a predetermined criteria.

15. A business intelligence system comprising:

subscribing means for allowing a user to select a subject matter area or areas of interest to that user;

searching means for accessing different information sources far identifying information items likely to relate to the selected area or areas of interest, for retrieving information items considered likely to relate to the selected area or areas of interest and for identifying any information items relating to the subject matter area or areas of interest;

evaluating means for applying an importance value to each information item relating to the subject matter areas of interest; and notifying means for notifying the user about any information items meeting predetermined criteria.

16. A client-server information system, the system comprising:

a client having an interface for selecting a subject matter area or areas of interest to a user; and a server for searching for information items likely to relate to the selected subject matter area or areas, retrieving information items considered likely to relate to the selected subject matter area or areas, identifying retrieved information items relating to the selected subject matter area or areas, rating the retrieved information items, and notifying the user of retrieved information items meeting a predetermined criteria.

17. A method of configuring an information system, the method comprising the steps of:

defining a one or more subject matter areas of interest;

identifying sources of information;

identifying infrastructures to be used; and configuring the identified infrastructures to employ resources to access the sources of information to retrieve information items relating to the subject matter area or areas of interest by searching the sources of information to identify information items likely to relate to the subject matter area or areas of interest, to retrieve items considered likely to relate to the subject matter area or areas of interest and to examine the retrieved information items to identify items relating to the subject matter area or areas of interest.

* * * * *